US009106530B1

(12) United States Patent
Wang

(10) Patent No.: US 9,106,530 B1
(45) Date of Patent: Aug. 11, 2015

(54) CONSTRAINED ROUTE DISTRIBUTION FOR MULTIPLE VIRTUAL PRIVATE NETWORK SERVICES

(71) Applicant: Juniper Networks, Inc., Sunnyvale, CA (US)

(72) Inventor: Lili Wang, Andover, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 150 days.

(21) Appl. No.: 13/851,852

(22) Filed: Mar. 27, 2013

(51) Int. Cl.
*H04L 12/28* (2006.01)
*H04L 12/24* (2006.01)

(52) U.S. Cl.
CPC .................................. *H04L 41/0803* (2013.01)

(58) Field of Classification Search
None
See application file for complete search history.

(56) References Cited

U.S. PATENT DOCUMENTS

2008/0044181 A1    2/2008  Sindhu

OTHER PUBLICATIONS

E. Chen, "Outbound Route Filtering Capability for BGP-4," draft-ietf-idr-route-filter-17.txt, Network Working Group, Internet Draft, Jun. 2008, 13 pp.
J. Dong et al., "Constrained Route Distribution for BGP based Virtual Private Networks (VPNs)," draft-dong-idr-vpn-route-constrain-02.txt, Network Working Group, Internet Draft, Sep. 27, 2010, 22 pp.
T. Bates et al., "Multiprotocol Extensions for BGP-4," Network Working Group, RFC 2858, Jun. 2000, 12 pp.
S. Sangli et al., "BGP Extended Communities Attribute," Network Working Group, RFC 4360, Feb. 2006, 13 pp.
E. Rosen, "BGP/MPLS IP Virtual Private Networks (VPNs)," Network Working Group, RFC 4364, Feb. 2006, 48 pp.
P. Marques et al., "Constrained Route Distribution for Border Gateway Protocol/MultiProtocol Label Switching (BGP/MPLS) Internet Protocol (IP) Virtual Private Networks (VPNs)," Network Working Group, RFC 4684, Nov. 2006, 15 pp.
T. Bates, "Multiprotocol Extensions for BGP-4," Network Working Group, RFC 4760, Jan. 2007, 12 pp.
R. Aggarwal, "BGP Encodings and Procedures for Multicast in MPLS/BGP IP VPNs," Internet Engineering Task Force, RFC 6514, Feb. 2012, 60 pp.
E. Chen, "Route Refresh Capability for BGP-4," Network Working Group, RFC 2918, Sep. 2000, 4 pp.

*Primary Examiner* — Afshawn Towfighi
(74) *Attorney, Agent, or Firm* — Shumaker & Sieffert, P.A.

(57) ABSTRACT

In general, techniques are described for ensuring the distribution of Virtual Private Network (VPN) routes in a service provider network configured with multiple VPN services. In some examples, a network device receives configuration data that defines a VPN service associated with a route target. The network device, responsive to receiving the configuration data, sends a request for routes that match a type of the VPN service to a routing protocol speaker. The network device receives routes that match the type of the VPN service and are associated with the route target, installs the routes that match the type of the VPN service and are associated with the route target to the routing information base. The network device forwards traffic for the VPN service in accordance with the installed routes.

24 Claims, 6 Drawing Sheets

CONSTRAINED ROUTE DISTRIBUTION FOR MULTIPLE VIRTUAL PRIVATE NETWORK SERVICES

TECHNICAL FIELD

The invention relates to computer networks and, more specifically, routing protocols for computer networks.

BACKGROUND

A service provider network includes one or more provider edge (PE) routers that extend attachment circuits to customer edge (CE) devices to provide services to customers of the service provider network. In some cases, the service provider network implements BGP/Multiprotocol Label Switching (BGP/MPLS) Internet Protocol (IP) Virtual Private Networks (VPNs) to segregate traffic for different customers by ensuring that routes from different VPNs remain distinct and separate, regardless of whether VPNs for respective customers have overlapping address spaces. For each VPN configured for the service provider network and in which a particular PE router participates, the PE router maintains a VPN Routing and Forwarding (VRF) instance. In general, each attachment circuit connecting a PE router and a CE device is associated with a VRF. For any given VPN, the PE router learns routes for the VPN, in some cases from the CE device, and installs the VPN routes to the corresponding VRF, which the PE router uses to forward traffic. In addition, the PE router distributes learned VPN routes to other PE routers of the service provider network (or to PE routers of one or more additional service provider networks) using BGP. BGP/MPLS IP VPNs are described in detail in Rosen & Rekhter, "BGP/MPLS IP Virtual Private Networks (VPNs)," Internet Engineering Task Force Network Working Group, Request for Comments 4364, February, 2006, which is incorporated herein by reference in its entirety (hereinafter "RFC 4364").

In BGP/MPLS IP VPNs, PE routers use Route Target (RT) extended communities ("route targets") to control the distribution of routes into VRFs. For a given collection of PE routers that peer using BGP, each PE router only stores VPN routes that are received and marked with route targets corresponding to VRFs that have local CE attachment circuits configured for the PE router. The PE router may discard all other VPN routes that it receives.

Because PE routers discard VPN routes that are not marked with a route target pertaining to a VRF of the PE router, techniques have been developed to constrain the distribution of VPN routes marked with a route target to those PE routers that will not discard the route target. For example, Marques et al., "Constrained Route Distribution for Border Gateway Protocol/MultiProtocol Label Switching (BGP/MPLS) Internet Protocol (IP) Virtual Private Networks (VPNs)," Internet Engineering Task Force Network Working Group, Request for Comments 4684, November, 2006 (hereinafter "RFC 4684") defines Multi-Protocol BGP (MP-BGP) procedures that allow PE routers to exchange route target reachability information, which PE routers and route reflectors of a service provider network may use to build a route distribution graphs for route targets and thereby limit the propagation of VPN routes. RFC 4684 is incorporated herein by reference in its entirety.

SUMMARY

In general, techniques are described for ensuring the distribution of Virtual Private Network (VPN) routes in a service provider network configured with multiple VPN services. The techniques may be applicable in a networking environment in which a provider edge (PE) router of a service provider network is configured to provide a first VPN service and to use a Route Target extended community to control the distribution of routes for the first VPN service to other PE routers of the service provider network.

In some examples, the techniques include defining a new BGP path attribute that specifies one or more VPN services in a BGP routing protocol message that includes route target reachability information. The aforementioned PE router may use the new BGP path attribute, also referred to herein as the "VPN-services attribute," to specify the first VPN service in a BGP routing protocol message that includes the route target in Route Target reachability information. Other BGP speakers of the service provider network, such as PE routers or a route reflector, that receive the BGP routing protocol message from the PE router may then filter outbound route advertisements to the PE router according to the route target and the first VPN service specified in the VPN-services attribute. Upon being configured to provide a second VPN service, different than the first, and to use the same route target to control the distribution of routes for the second VPN as the route target to control the distribution of routes for the first VPN, the PE router again uses the VPN-services attribute to specify the second VPN service in a BGP routing protocol message that includes the route target in Route Target reachability information. Other BGP speakers that receive the BGP routing protocol message modify their outbound route filters to send route advertisements to the PE router according to the route target, the first VPN service, and the second VPN service. As a result, the PE router receives routes for the second VPN service despite there being no change, from the perspective of other BGP speakers, in the Route Target extended community membership of the PE router. In addition, the techniques may reduce the number of advertisements of routes for multiple VPN services that overload a route target but that are not configured on each and every PE router that is a member of the Route Target extended community.

In some examples, the techniques include storing associations with the PE router between a route target and those VPN services configured on the PE router to advertise routes using the route target. Upon being configured with a new VPN service that is associated with a route target already configured on the PE router for use in importing routes for a previously configured VPN service, the PE router determines that it is already a member of the Route Target extended community. To obtain the routing database for the new VPN service associated with the route target, the PE router therefore issues one or more route refresh messages that specify the newly-configured VPN service to other BGP speakers. As a result, the BGP speakers respond to the PE router with matching VPN routes, which the PE router uses to populate the routing information base for the new VPN service configured on the PE router. Moreover, these example techniques implemented by locally enhancing the PE router may allow the PE router to retain interoperability with legacy BGP speakers while nevertheless allowing for the receipt of needed VPN routes. That is, legacy BGP speakers such as a route reflector do not necessarily need to be modified in order to respond to a route refresh message to provide VPN routes for newly configured VPN service on the PE router.

In one aspect, a method includes receiving, with a network device, configuration data that defines a virtual private network (VPN) service and associates the VPN service with a route target, wherein the route target identifies the network device as a member of a route target extended community.

The method also includes, responsive to receiving the configuration data, sending a request for routes that match a type of the VPN service from the network device to a routing protocol speaker. The method further includes receiving, with the network device, routes that match the type of the VPN service and are associated with the route target. The method also includes installing the routes that match the type of the VPN service and are associated with the route target to a routing information base of the network device. The method further includes forwarding traffic for the VPN service with the network device in accordance with the installed routes.

In another aspect, a method includes receiving, with a network device, a Border Gateway Protocol (BGP) message from a BGP peer, wherein the BGP message advertises membership of the BGP peer in a route target extended community corresponding to the route target, and wherein the BGP message includes a path attribute that specifies a type of a VPN service. The method also includes identifying, with the network device, routes stored by a routing information base of the network device that match both the type of the VPN service and the route target. The method further includes advertising the identified routes to the BGP peer.

In another aspect, a method includes receiving, with a network device and from a Border Gateway Protocol (BGP) peer that is a member of a route target extended community corresponding to a route target, a request for routes that match a type of the virtual private network (VPN) service. The method also includes, responsive to the request for routes, applying an export policy only to routes of a routing information base of the network device that match both the type of VPN service and the route target. The method further includes sending routes permitted by the export policy to the BGP peer.

In another aspect, a network device includes a control unit having a processor, a routing information base, and a management interface executed by the control unit to receive configuration data that defines a virtual private network (VPN) service and associates the VPN service with a route target, wherein the route target identifies the network device as a member of a route target extended community. The network device also includes a routing protocol module executed by the control unit to, responsive to receiving the configuration data, send a request for routes that match a type of the VPN service to a routing protocol speaker, wherein the routing protocol module receives routes that match the type of the VPN service and are associated with the route target, wherein the routing protocol module installs the routes that match the type of the VPN service and are associated with the route target to the routing information base, and wherein the network device forwards traffic for the VPN service in accordance with the installed routes.

In another aspect, a network device includes a control unit having a processor, a routing information base, and a routing protocol module executed by the control unit to receive a Border Gateway Protocol (BGP) message from a BGP peer, wherein the BGP message advertises membership of the BGP peer in a route target extended community corresponding to the route target, and wherein the BGP message includes a path attribute that specifies a type of a VPN service. The routing protocol module identifies routes stored by the routing information base that match both the type of the VPN service and the route target, and the routing protocol module advertises the identified routes to the BGP peer.

In another aspect, network device includes a control unit having a processor, a routing information base, and a routing protocol module executed by the control unit to receive, from a Border Gateway Protocol (BGP) peer that is a member of a route target extended community corresponding to a route target, a request for routes that match a type of the virtual private network (VPN) service. The routing protocol module, responsive to the request for routes, applies an export policy only to routes of the routing information base that match both the type of VPN service and the route target, and the routing protocol module sends routes permitted by the export policy to the BGP peer.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
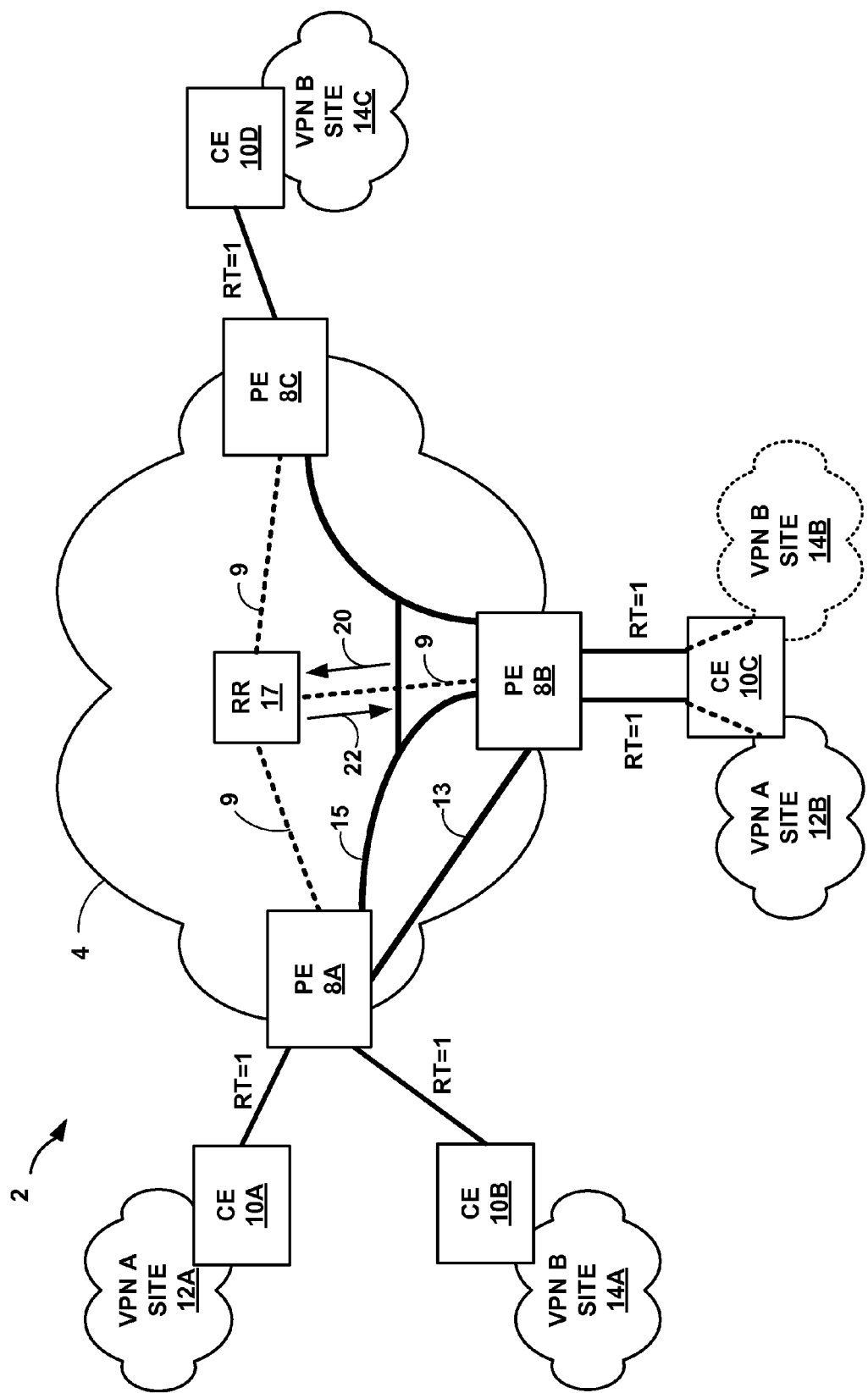
FIG. 1 is a block diagram illustrating an example network system in accordance with techniques described in this disclosure.

FIG. 1 is a block diagram illustrating an example network system in accordance with techniques described in this disclosure. Network system 2 includes network 4, which may represent a service provider (SP) network that provides services to one or more customers of the service provider. Network 4 may alternatively, or additionally, represent an enterprise or campus network, a connectivity access network (CAN), or a content delivery network (CDN), for example.

Network 4 includes PE routers 8A-8C (collectively, "PE routers 8") that execute one or more interior gateway protocols, such as Open Shortest Path First (OSPF), Routing Information Protocol (RIP), Intermediate System-to-Intermediate System (IS-IS), Interior Gateway Routing Protocol (IGRP), Enhanced IGRP (EIGRP), and Interior Border Gateway Protocol (iBGP). PE routers 8 are logically located at the "edge" of network 4 and extend attachment circuits to customer edge devices 10A-10D (collectively, "CE devices 10") to provide services to one or more customers, including virtual provide network (VPN) services. Each of CE devices 10 represents a network device, located at a customer site, that connects to network 4 to receive services of network 4. Each of CE devices 10 may include an Internet Protocol (IP) router, Ethernet switch, Asynchronous Transfer Mode (ATM) switch, Frame Relay switch.

In some cases, network 4 implements BGP/Multiprotocol Label Switching (BGP/MPLS) Internet Protocol (IP) Virtual Private Networks (VPNs) to segregate traffic for different customers by ensuring that routes from different VPNs remain distinct and separate, regardless of whether multiple VPNs for respective customers have overlapping address spaces. For each VPN configured for the service provider network and in which a particular one of PE routers 8 participates, the PE router maintains a VPN Routing and Forwarding (VRF) instance. Every attachment circuit connecting one of PE routers 8 and one of CE devices 10 is associated with a VRF. For any given VPN, the PE router 8 learns routes for the VPN, in some cases from the connective CE device 10, and installs the VPN routes to the corresponding VRF, which the PE router 8 uses to forward traffic. In addition, the PE router 8 distributes learned VPN routes to other PE routers 8 of network 4 using BGP. BGP/MPLS IP VPNs are described in detail in RFC 4364, incorporated above.

Within a single VPN, pairs of PE routers 8 connect by a tunnel (not shown for ease of illustration), which may include an MPLS label switched path (LSP), Generic Route Encapsulation tunnel, or other suitable connection between pairs of PE routers 8 that is capable of transporting IP traffic between the PE routers. PE routers 8 may establish tunnels using, e.g., Resource Reservation Protocol (RSVP) or Label Distribution Protocol (LDP).

Network 4 may additionally one or more core (P) routers (not shown for ease of illustration) that do not directly connect to any of CE devices 10 but that implement, at least in part, tunnels between pairs of PE routers 8 for IP VPNs. P routers may support MPLS LSP or label distribution protocol (LDP) functionality, for instance, but the P routers do not necessarily need to support VPN functionality.

Network 4 provides VPN services in the form of VPN A 13 and VPN B 15 to one or more customers. For instance, VPN A 13 may be associated with a first customer, and VPN B 15 may be associated with a second, different customer. Alternatively, VPN A 13 and VPN B 15 may both be associated with a single customer. Network 4 provides VPN A 13 to interconnect VPN A sites 12A, 12B (collectively, "VPN A sites 12"). Network 4 provides VPN B 15 to interconnect VPN B sites 14A-14C (collectively, "VPN B sites 14").

In the illustrated example, to advertise VPN routes for VPN A 15 and VPN B 13, PE routers 8 establish BGP peering sessions 9 with route reflector 17 to internally advertise topology information, e.g., routes, for corresponding VPN sites 12, 14 to other PE routers 8. Route reflector 17 is a BGP speaker that re-advertises (or "reflects") routes received from other BGP speakers (here, "PE routers 8") to enable the BGP speakers to avoid forming a full mesh of peering sessions. However, in examples of network 4 that do not include route reflector 17, the BGP speakers may form a full mesh of peering sessions. That is, in some examples, PE routers 8 may establish BGP peering sessions 9 with each other, rather than with route reflector 17. Devices that peer with one another using BGP peering sessions 9 are alternatively referred to herein as "BGP peers."

PE routers 8 exchange (by route reflector 17) route advertisements, such as iBGP UPDATE messages, that include routes for VPN A 15 and VPN B 13. In general, a route advertisement associates a prefix with a next hop router for the prefix ("NEXT_HOP" in iBGP UPDATE messages) and a list of one or more autonomous systems that must be traversed to reach the prefix ("AS_PATH" in iBGP UPDATE messages). Description herein of techniques that are ascribed to one type of BGP speaker, e.g., a route reflector such as RR 17, may alternatively be performed by another type of BGP speaker, e.g., a PE router such as PE router 8A.

PE routers 8 use Route Target (RT) extended communities (hereinafter, "route targets" or "RTs") to control the distribution of routes. Upon receiving a route advertisement, a PE router 8 will install the included route when the route advertisement includes a route target attribute having a route target that the PE router 8 is configured to import. In some instances, the PE router 8 installs the included route to a VPN routing and forwarding instance (VRF) associated with the route target, as described in RFC 4364, incorporated above. PE router 8 may discard all other routes.

In some examples, any of PE routers 8 may advertise route target reachability information to other BGP speakers to notify the other BGP speakers of membership of the PE router within the route target extended community. For example, PE router 8A may send a Route Target Membership Network Layer Reachability Information (NLRI) that specifies a route target with value "1", in accordance with RFC 4684, to RR 17 (or any others of PE routers 8). RR 17 may use the Route Target membership NLRI to build a distribution graph, including PE router 8A, for routes associated with the specified route target. RR 17 thereafter advertises routes associated with the specified route target to PE router 8A.

VPN A 13 and VPN B 15 may each represent, for example, any one or more of a IPv4 or IPv6 layer three (L3) VPN (L3VPN), unicast VPN, multicast VPN (MVPN), or a type of layer two (L2) VPN (L2VPN) such as Virtual Private LAN Service (VPLS), Virtual Private Multicast Service (VPMS), Ethernet VPN, or other type of L2VPN. Each of these above examples is a VPN service type. In some cases, VPN A 13 and VPN B 15 may provide different types of VPN service. For example, VPN A 13 may provide an IPv4 VPN, while VPN B 15 may provide an IPv6 VPN. As another example, VPN A 13 may provide an L3VPN, while VPN B 15 may provide an L2VPN. As another example, VPN A 13 may provide a unicast VPN, while VPN B 15 may provide a multicast VPN. As a still further example, VPN A 13 may provide an Ethernet-based L2VPN, while VPN B 15 may provide a VPLS-based L2VPN. In some instances, one or more sites of a VPN may not share the capabilities of other sites of the VPN. For example, in some instances, VPN A site 12A may only support IP unicast, while VPN A site 12B supports both IP unicast and IP multicast.

Network 4 isolates different types of VPN services using different Address Family Identifier/Subsequent Address Family Identifier (AFI/SAFI) values. In general, the AFI identifies the network layer protocol associated with the network address for the next hop and NLRI of an attribute of a route advertisement, and the SAFI provides additional information about the type of NLRI carried in the attribute. In this way, route advertisements may include an AFI/SAFI value pair to indicate the type of VPN service for the included route. Additional information regarding AFI and SAFI is found in Bates et al., "Multiprotocol Extensions for BGP-4," Internet Engineering Task Force Network Working Group, Request for Comments 2858, June, 2000, which is incorporated herein by reference in its entirety (hereinafter, "RFC 2858").

Because different types of VPN services may be isolated as described above, PE routers 8 may be configured to overload different types of VPN services provided by PE routers 8 with the same route target. In other words, the route target configurations for VPNs that provide different types of VPN services (and are therefore indicated by different AFI/SAFIs) do not affect one another. In the illustrated example, PE routers 8 are configured with the same route target (RT=1) for VPN A 13 and VPN B 15. For instance, VPN A 13 may represent a Multicast VPN having RT=1 and VPN B 15 may represent a unicast VPN having a same route target value, where VPN A 13 and VPN B 15 are configured on a same VRF, in accordance with the default route target membership specified in Aggarwal et al., "BGP Encodings and Procedures for Multicast in MPLS/BGP IP VPNs", Internet Engineering Task Force, Request for Comments 6514, February, 2012, which is incorporated by reference herein in its entirety.

Because of route target overloading, any of PE routers 8 may receive routes for VPN services for which the PE router 8 has not been configured. For example, in cases where VPN A 13 is a L2VPN and VPN B 15 is a L3VPN, PE router 8C may receive L2VPN routes unnecessarily and discard such routes on receipt to avoid storing unneeded routes. Similar situations exist for many different combinations of VPN A 13 and VPN B 15, where VPN A 13 and VPN B 15 provide different types of VPN service, e.g., any of the combinations described above.

In accordance with techniques described in this disclosure, PE router 8B stores associations between the route target for VPN A 13 and VPN B 15 (i.e., RT=1) and the VPN services configured for PE router 8B. For example, PE router 8B may store associations between the route target and AFI/SAFI pair values for the associated VPN services. PE router 8B uses these stored associations to request routes for a newly configured VPN service that overloads route target for a previously configured VPN service.

In the example of FIG. 1, PE router 8B is initially configured with VPN A 13 associated with RT=1. However, RT=1 is also associated in network 4 with VPN B 15 routes. During operation, PE router 8B therefore receives VPN routes for VPN A 13 and VPN B 15 despite not being configured to support VPN B 15. As a result, PE router 8B initially discards VPN routes for VPN B 15. PE router 8B also stores an association between VPN service type for VPN A 13 and route target RT=1.

Subsequently, an administrator or other entity installs configuration information to PE router 8B to configure PE router 8B to support VPN B 15 for VPN B site 14B (VPN B site 14B is illustrated in FIG. 1 using dashed lines to indicate the transition). VPN B 15 overloads, or shares, the route target with VPN A 13, i.e., RT=1 but provides a different VPN service type and is associated with a different AFI/SAFI pair value than that of VPN A 13. Because PE router 8B is already a member of the RT=1 community, RR 17 does not automatically distribute the routing information base including VPN routes for RT=1 to PE router 8B due to the newly configured support for VPN B 15 on PE router 8B.

In response to the new configuration, and in accordance with techniques of this disclosure, PE router 8B queries the stored associations and determines that an association for RT=1 already exists (in particular, an association between RT=1 and the VPN service type for VPN A 13). In this example, to receive VPN routes for RT=1 for the VPN service type for VPN B 15, PE router 8B issues route refresh message 20 specifying the VPN service type for VPN B 15. RR 17 receives route refresh message 20 and responds to PE router 8B with route advertisements 22 that are associated with the VPN service type for VPN B 15 and RT=1. PE router 8B imports the routes carried in route advertisements 22 and uses the routes to forward traffic to/from VPN B site 14B. In this sense, route refresh message 20 is a request for routes that match both the VPN service type for VPN B 15 and the route target, RT=1. In at least some examples, route refresh message 20 does not include the route target, RT=1.

Route refresh message 20 may, in one example, represent a BGP route refresh message that specifies an AFI/SAFI for the VPN service type for VPN B 15. The Internet Assigned Numbers Authority (IRNA) defines AFI and Subsequent AFI values for various network layer protocols and service types. In accordance with IRNA-defined values, for instance, if the VPN service type for VPN B 15 is VPLS, route refresh message 20 may specify an AFI/SAFI with value 1/65. As another example, if the VPN service type for VPN service type of VPN B 15 is unicast IPv6, route refresh message 20 may specify an AFI/SAFI with value 2/1. Additional details regarding the BGP route refresh message are found in Chen, "Route Refresh Capability for BGP-4," Internet Engineering Task Force Network Working Group, Request for Comments 2918, September, 2000, which is incorporated herein by reference in its entirety.

In this way, BGP speakers of network 4 respond to PE router 8B with matching VPN routes, which PE router 8B uses to populate the routing information base for newly-configured VPN B 15. Moreover, by locally enhancing the PE router 8B, the techniques may allow PE router 8B to retain interoperability with legacy BGP speakers while nevertheless allowing for the receipt of needed VPN routes for newly-configured VPN B 15 in a network environment in which PE router 8B is configured with multiple VPN services that overload a single route target. That is, legacy BGP speakers, e.g., RR 17, do not necessarily need to be modified in order to respond to route refresh message 20 to send VPN routes for VPN B 15.

In some instances, BGP speakers of network 4 that receive a route refresh message 20 that specifies a VPN service type may filter an outbound routing information base (e.g., an Adj-RIB-Out) for the specified VPN service type according to existing route target membership information known to the BGP speakers. For example, RR 17 receives route refresh message 20 that specifies a VPN service type for VPN B 15. RR 17 has previously received, from PE router 8B, a route target reachability information indicating membership, by PE router 8B, in route target, RT=1. In accordance with techniques of this disclosure, RR 17 may therefore apply an export policy only to the subset of routes in a routing information base for the VPN service type for VPN B 15 that match route target, RT=1. RR 17 may receive the export policy from PE router 8B.

Consequently, RR 17 does not need to apply an export policy to each of the routing information bases for the target VPN service type (or the address family) and to every route regardless of associated route target. Rather, RR 17 may limit application of the export policy to the subset of routes that both match route targets for PE router 8B and match the target VPN service type specified in route refresh message 20. RR 17 sends routes permitted by the export policy to PE router 8B, responsive to route refresh message 20, in route advertisements 22.

Figure 2:
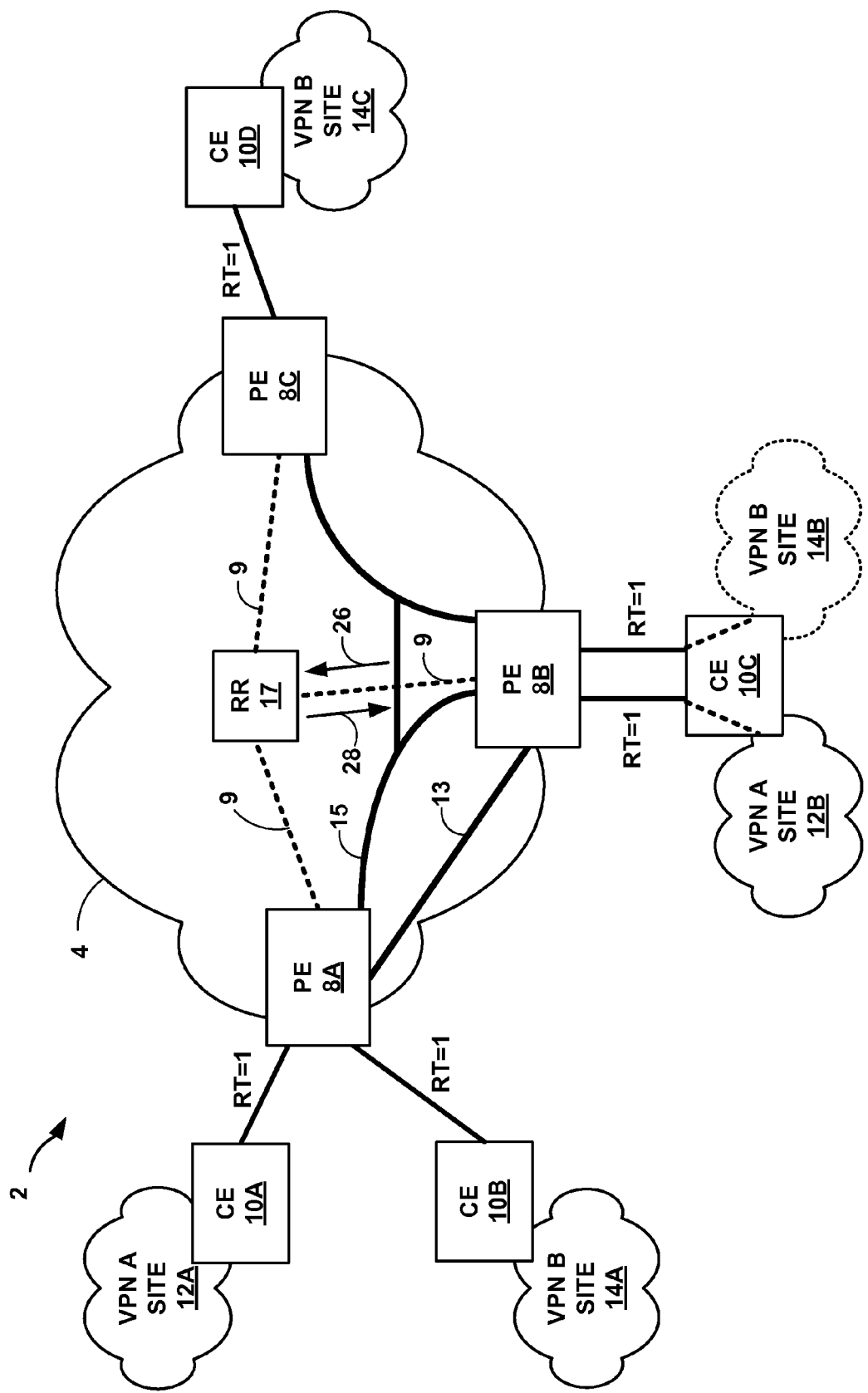
FIG. 2 is a block diagram illustrating an example network system in which a provider edge (PE) router sends a route advertisement that includes a path attribute to list types of virtual private network (VPN) service configured for a route target extended community of which the PE router is a member, in accordance with techniques described in this disclosure.

FIG. 2 is a block diagram illustrating another example implementation of network system 2 of FIG. 1. In this example, provider edge (PE) router 8B sends a route advertisement 26 that includes a path attribute to list types of virtual private network (VPN) services configured for a route target extended community of which the PE router is a member. That is, PE router 8B lists VPN service types associated with a route target in a route target reachability information message to other BGP speakers. For example, for VPN services configured for a VRF of PE router 8B, PE router 8B sends a route target reachability information message to other BGP speakers of network 4 that specifies not only a route target but also the types of the configured VPN services.

In the illustrated example, upon being configured with VPN B 15 that is associated with route target RT=1, PE router 8B advertises its route target reachability by sending route target reachability information message 26 to RR 17. Route target reachability information message 26 specifies a route target, RT=1, and also specifies the VPN service types for VPN A 13 and VPN B 15 configured on and supported by PE router 8B. Route target reachability information message 26 may represent a route advertisement that includes a Route Target membership NLRI that specifies a route target, RT=1, and further includes a path attribute that lists the VPN service types for VPN A 13 and VPN B 15. In this sense, route target reachability information message 26 is a request for routes that match both the VPN service type for VPN B 15 and the route target, RT=1. A more detailed example of a route target reachability information message 26 is described below with respect to FIG. 5.

Route reflector 17 receives route target reachability information message 26 and determines the one or more VPN service types and the route target specified therein. In some instances, route reflector 17 may extract the one or more VPN service types from the path attribute and extracts the route target membership information from the Route Target membership NLRI in instances where route target reachability information message 26 represents a route advertisement that includes a Route Target membership NLRI. Responsive to receiving route target reachability information message 26, route reflector 17 sends, in one or more route advertisements 28, VPN routes for the one or more VPN service types that match the route target, as specified in route target reachability information message 26. In some instances, route reflector 17 may store associations between a route target and one or more VPN service types for each of PE routers 8. Subsequently, if route reflector 17 receives a route target reachability information message 26 that specifies a VPN service type not previously associated with the specified route target, route reflector 17 may respond with only those routes that match both the new VPN service type and the route target, rather than with all VPN service types previously and newly associated with the route target. Route reflector 17 updates the associations to include the newly-specified VPN service type.

Figure 3:
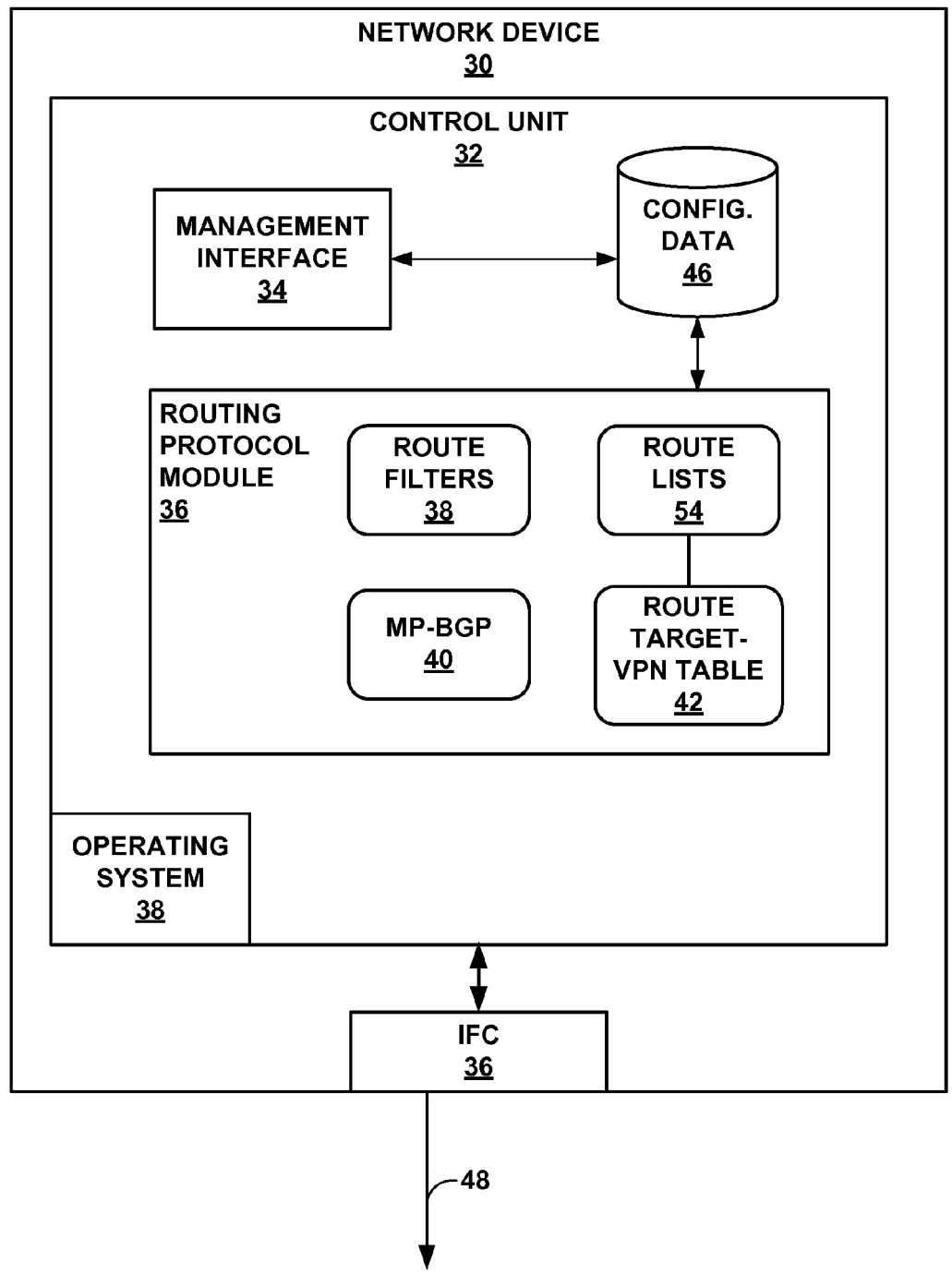
FIG. 3 is a block diagram illustrating an example network device that implements one or more of the techniques described in this disclosure.

FIG. 3 is a block diagram illustrating an example network device that implements one or more of the techniques described in this disclosure. For purposes of illustration, example network device 30 is described in the context of network system 2 and may represent any of the BGP speakers of network 4 of FIGS. 1-2. For example, network device 30 may represent PE router 8B or route reflector 17. Not all instances of network device 30 include each of the components described, for not all instances of network device 30 necessarily perform all of the techniques described herein.

Network device 30 includes a control unit 32 and interface card (IFC) 36 coupled to control unit 32 via internal links. Control unit 32 may comprise one or more processors (not shown in FIG. 3) that execute software instructions, such as those used to define one or more software or computer programs, stored to a computer-readable storage medium (again, not shown in FIG. 3), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 32 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 32 represents hardware or a combination of hardware and software of that define control plane functionality of network device 30. Control unit 32 manages and controls the behavior of network device 30. Operating system 38 of control unit 32 provides a run-time environment for one or more processes. Operating system 38 may represent, for example, a UNIX operating system derivative such as Linux or Berkeley Software Distribution (BSD).

In the illustrated example, routing protocol module 36 (hereinafter, "RP module 36") represents a routing protocol process that executes Multiprotocol BGP (MP-BGP) 40 by which routing information stored to one or more routing information bases may be determined. Routing protocol module 36 resolves the topology defined by routing information to select and/or determine one or more routes through the network for the network layer protocols. Routing protocol module 36 may then update IFC 36 with these routes, where IFC 36 maintains a representation of these routes as respective forwarding information bases. IFC 36 may represent one or more forwarding units that each includes, for example, one or more packet forwarding engines ("PFEs") each coupled to one or more interface cards. A forwarding unit may each represent, for example, a dense port concentrator (DPC), modular port concentrator (MPC), flexible physical interface card (PIC) concentrator (FPC), or another line card, for instance, which is insertable within a network device 30 chassis or combination of chassis.

Management interface 34 (illustrated as "mgmt. interface 34") is a process executing on control plane 32 that provides an interface by which an administrator, e.g., a network operator or network management system, may modify configuration data 46 of network device 30. Management interface 34 may present a Command Line Interface (CLI) and/or a graphical user interface (GUI) by which an administrator or other management entity may modify the configuration of network device 30 using text-based commands and/or graphical interactions, respectively. In addition, or in the alternative, management interface 34 may present an agent that receives Simple Network Management Protocol (SNMP) or Netconf commands from a management entity to set and retrieve configuration and management information for network device 30.

In particular, in instances of network device 30 that represent a PE router, management interface 34 may receive (and install to configuration data 46) configuration information that defines one or more virtual private network (VPN) services to be supported by network device 30. In some examples, each of the VPN services is defined within any of one or more routing instances also configured in configured data 46 for network device 30. The configuration information for a particular VPN service may specify the VPN service type, interfaces of network device 30 that are connected to a CE device for the VPN service, and VPN routing and forwarding instance (VRF) export and import policies that define route distribution within the network. The VRF export and import policies associate at least one route target with a VRF that is itself associated, in configuration data 46, with the VPN service. In this way, the VPN service is associated in configuration data 46 with the at least one route target. A VPN service type may be associated with an AFI/SAFI value pair.

Route target-VPN table 42 of routing protocol module 36 stores associations between route targets and VPN service types configured in network device 30 as associated with a VRF export/import policy that specifies the route targets. In some instances, route target-VPN table 42 represents an associative data structure, stored to a computer-readable media, that is separate from configuration data 46. In some instances, RP module 36 identifies associations between route targets and VPN service types by querying and analyzing configuration data 46, and in such instances route target-VPN table 42 may be considered part of configuration data 46.

In accordance with techniques described in this disclosure, network device 30 operating as a PE router receives, by management interface 34, configuration data that defines a new VPN service and associates the new VPN service with a route target. Network device installs the received configuration data to configuration data 46.

In some instances, network device 30 queries route target-VPN table 42 to determine the route target has a preexisting association with another VPN service defined in configuration data 46. Network device 30 therefore issues request 48, which includes a request for routes that match the type of the newly-configured VPN service, to one or more BGP speakers of the network. Request 48 may in these instances include a route refresh message that specifies an AFI/SAFI pair value that identifies the type of the newly-configured VPN service. Network device 30 receives routes responsive to request 48 and installs the routes for use in forwarding traffic for the VPN service.

In some instances, in response to receiving configuration data defining the new VPN service, network device 30 issues request 48 to one or more BGP speakers of the network. Request 48 represents a request for routes that match the type of the newly-configured VPN service. In such instances, request 48 includes a Route Target Membership NLRI specifying the route target associated with the newly-configured VPN service. In accordance with the described techniques, request 48 also includes a BGP path attribute that lists one or more VPN service types including the type of the newly-configured VPN service. Network device 30 receives routes responsive to request 48 and installs the routes for use in forwarding traffic for the VPN service.

In some instances, route target-VPN table 42 may further associate routes in route lists 54 with a route target and VPN address family (e.g., AFI/SAFI). Each of route lists 54 includes a list of routes associated with a particular route target, VPN address family combination. Network device 30 may use route target-VPN table 42 and route lists 54 to optimize the process of route distribution responsive to receiving a request 48. Network device 30 may further use route target-VPN table 42 to track the existing address families for a route target for a given BGP speaker, e.g., by using a bit to mark entries for existing configured VPN services.

In some instances, network device 30 represents a PE router or route reflector that receives request 48 issued by a sending PE router. In cases in which request 48 includes a Route Target Membership NLRI specifying a route target and also includes a BGP path attribute that lists one or more VPN service types, network device 30 extracts the one or more VPN service types and the route target from request 48. Network device 30 then queries route target-VPN table 42 for the VPN service types and responds to request 48 with routes of route lists 54 that match both the route target and any of the listed VPN service types.

In cases in which request 48 is a route refresh message, network device 30 extracts the VPN service type, queries the route target constraint routes from the peer that issued request 48 to obtain the route targets for the peer, and responds to request 48 with routes that match the VPN service type and any of the route targets for the sending PE router. Network device 30 may apply route filters 38 only to the subset of routes that match the VPN service type and a route target for the sending PE router.

In some example implementations, network device 30 may be a high-end router capable of deployment within a service provider network. In such example, network device 30 may include a forwarding plane comprising forwarding integrated circuits associated with high-end routing and forwarding components of a network router. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Figure 4:
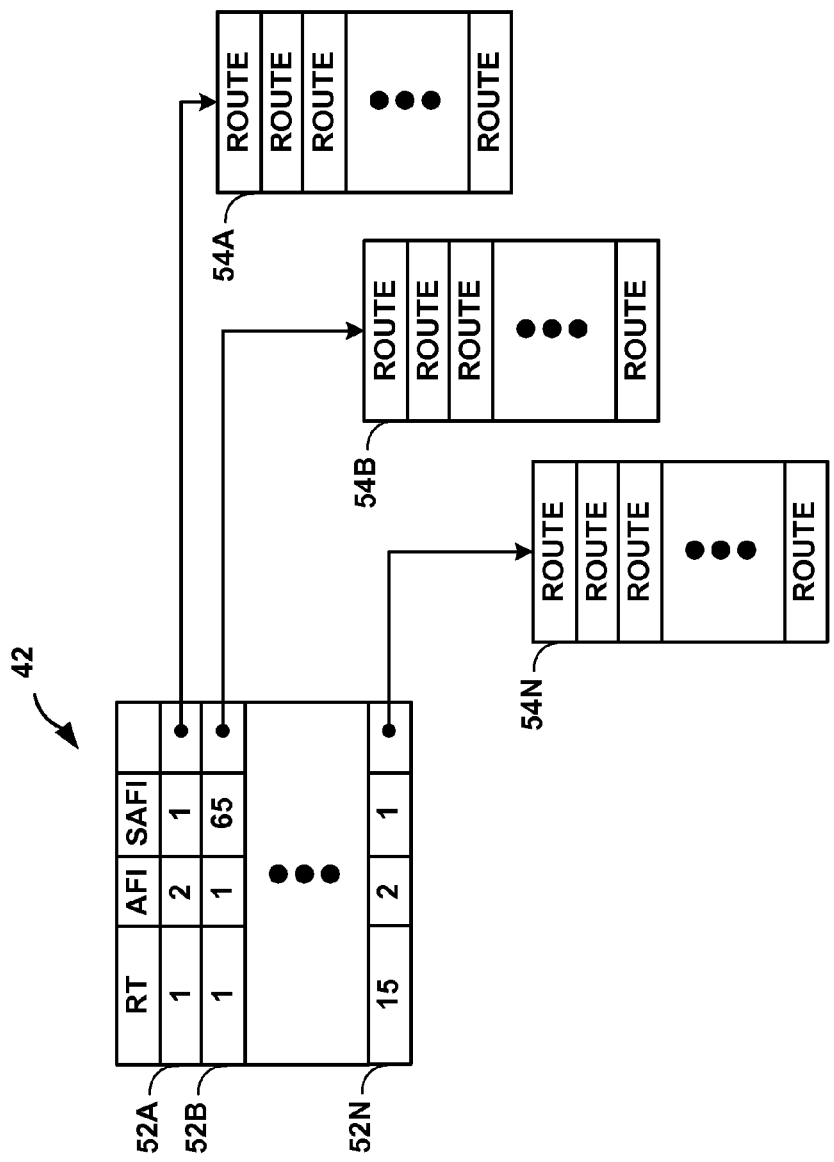
FIG. 4 is a block diagram illustrating example components of a network device for performing techniques described in this disclosure.

FIG. 4 is a block diagram illustrating example components of a network device for performing techniques described in this disclosure. Route target-VPN table 42 represents an associative data structure having one or more entries 52A-52N (collectively, "entries 52") that each associates a route target with an identifier for a VPN service type and with one of route lists 54. In the illustrated example, the identifier for a VPN service type is an AFI/SAFI value pair. Thus, for instance, entry 52A associates route target, RT=1, with AFI/SAFI 2/1 (i.e., IPv6 unicast according to the IRNA). Although referred to as a "table," route target-VPN table 42 may be arranged as any suitable data structure, such as a tree, linked list, hash table, multi-dimensional array, database, flat file, or the like. For example, route target may be first key of a tree and VPN service type may be a second key of the tree. The tree may include multiple tiers.

A network device may use route target-VPN table 42 to identify whether a newly-configured VPN service for the network device is associated with a route target of which the network device is already a member due to an earlier-configured VPN service. For instance, a network device may receive configuration data defining a new VPN service with AFI/SAFI 1/65 and route target, RT=1 (e.g., represented by entry 52B). The network device may determine route target, RT=1, is already configured as associated with another VPN service as represented by entry 52B. The network device may therefore issue a route refresh that specifies the type of the newly-configured VPN service to other BGP speakers in order to receive the routing database for the newly-configured VPN service.

Using a combination of route target and VPN service type determined from a BGP UPDATE message or a BGP route refresh message in addition to route target constraint routes from the peer, a network device may query route target-VPN table 42 to identify one of route lists 54 that includes the routes that match the route target and VPN service type. The network device may then apply an export policy only to those matching routes and avoid walking a complete radix tree for the VPN service type.

Figure 5:
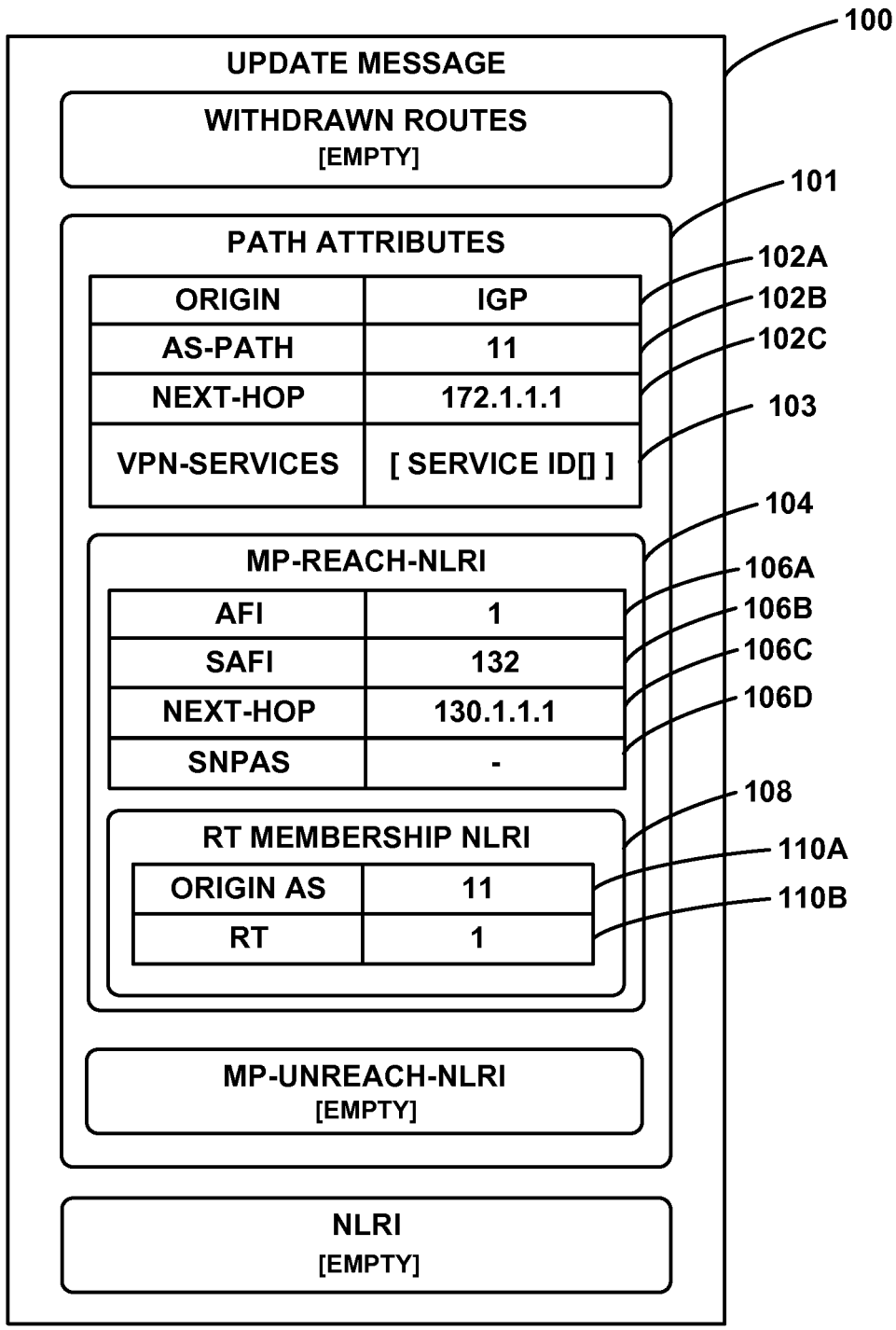
FIG. 5 is a block diagram illustrating an example BGP UPDATE message that includes a VPN-services path attribute according to techniques described in this disclosure.

FIG. 5 is a block diagram illustrating an example BGP UPDATE message that includes a VPN-services path attribute according to techniques described in this disclosure. BGP UPDATE message 100 conforms to MP-BGP and includes MP-REACH-NLRI 104 advertising NLRI. BGP UPDATE message 100 may represent an example instance of route target reachability information message 26 of FIG. 2. For purposes of illustration, BGP UPDATE message 100 is illustrated using glyphs, rather than with packet fields.

BGP UPDATE message include path attributes 101, which include ORIGIN 102A, AS-PATH 102B, NEXT-HOP 102C, VPN-SERVICES 103, and MP-REACH-NLRI 104. Each of path attributes 101 includes a triple <attribute type, attribute length, attribute value> of variable length.

MP-REACH-NLRI 104 of extended BGP UPDATE message 100 specifies an Address Family Identifier (AFI) 106A of 1 in this example to indicate IPv4 network addresses, along with a value for the Subsequent AFI (SAFI) 106B of 132 to identify NLRI as carrying Route Target Membership NRLI Advertisement defined by the AFI/SAFI combination 1/132. AFI 106A and SAFI 106B may in some instances have different values, as assigned by a private party or by IRNA.

Route Target Membership NLRI 108 is an NLRI field of MP-REACH-NRLI 104 and advertises membership for the sending PE router in a route target extended community. Route Target Membership NLRI 108 includes a prefix having an Origin Autonomous System (AS) field 110A specifying the originating AS for BGP UPDATE message 100 and route target (RT) field 110B specifying a route target in which the sending PE router is advertising membership.

In accordance with techniques described herein, path attributes 101 includes VPN-SERVICES path attribute 103 that specifies one or more VPN service types for the route target being advertised by Route Target Membership NLRI 108. The value of VPN-SERVICES path attribute 103 is illustrated in FIG. 5 as an array of service identifiers ("SERVICE ID[ ]"). VPN-SERVICES path attribute 103 is an optional non-transitive attribute with the attribute type is to be determined.

In some instances, the VPN-SERVICES path attribute 103 attribute value is encoded as a list of AFI/SAFI value pairs, with each AFI/SAFI pair indicating a different VPN service type (i.e., the types of VPN routes covered by the route target advertised by Route Target Membership NLRI 108). In such instances, each service identifier is an AFI/SAFI value pair. Because AFI is defined as two octets and SAFI is defined as one octet, an AFI/SAFI pair is a multiple of three octets and the number of pairs may therefore be inferred according to the VPN-SERVICES path attribute 103 attribute length. A BGP speaker, e.g., PE router 8B of FIGS. 1-2, may use BGP UPDATE message 100 including VPN-SERVICES path attribute 103 to define the types of VPN routes in which the BGP speaker is interested for a particular route target being advertised in Route Target Membership NLRI 108. If path attributes 101 does not include a VPN-SERVICES path attribute 103, the receiving BGP speaker may return all types of VPN routes for the route target specified in Route Target Membership NLRI 108.

Figure 6:
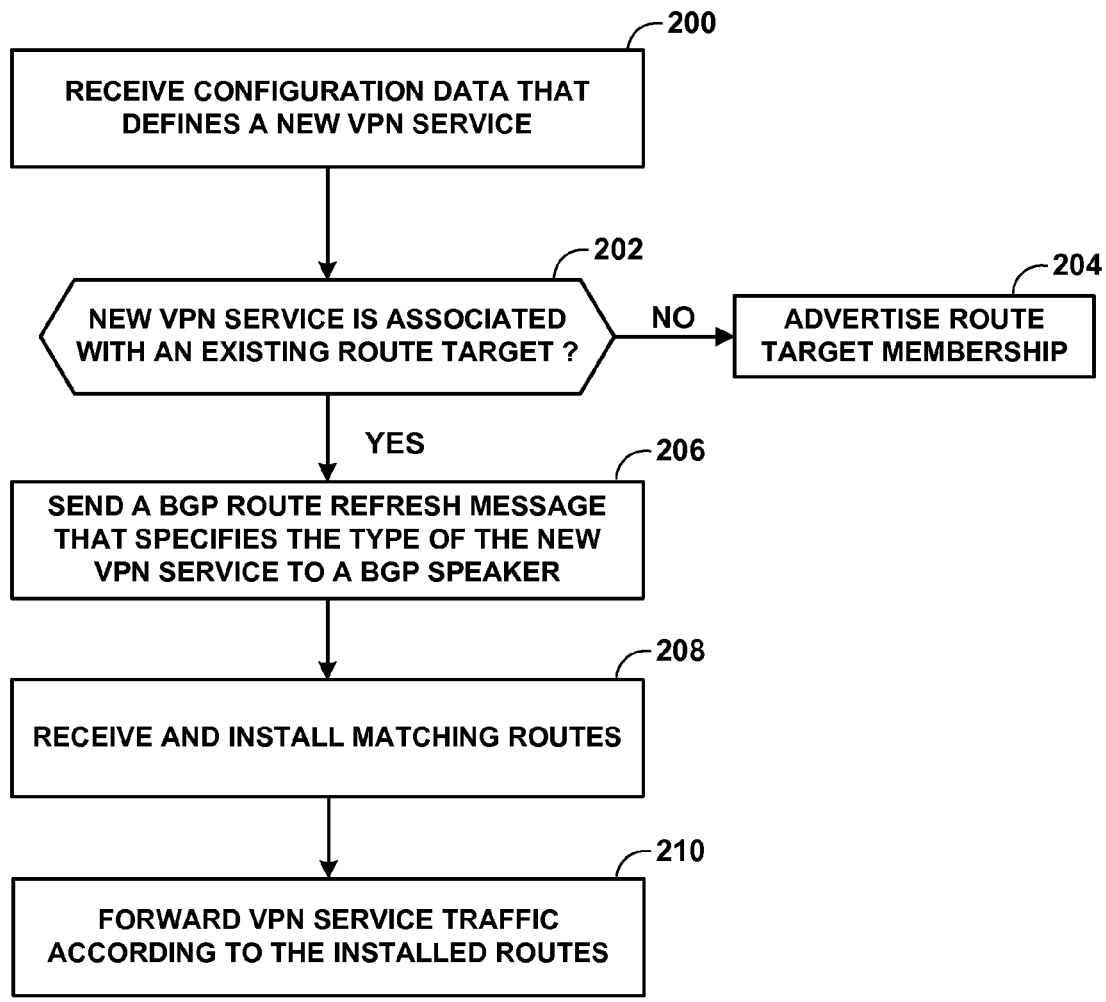
FIG. 6 is a flowchart illustrating an example mode of operation of a network device for sending a route refresh upon being configured with a virtual private network (VPN) service that overloads a route target for a VPN service previously configured on the network device, in accordance with techniques described in this disclosure.

FIG. 6 is a flowchart illustrating an example mode of operation of a network device for sending a route refresh upon being configured with a virtual private network (VPN) service that overloads a route target for a VPN service previously configured on the network device, in accordance with techniques described in this disclosure. The example mode of operation is described with respect to network device 30 of FIG. 3.

Initially, network device 30 receives configuration data from an administrator or other entity by management interface 34 (200). The configuration data defines a new VPN service to be supported by network device 30. Routing protocol module 36 queries route target-VPN table 42 to determine whether the new VPN service is associated, in the configuration data, with a route target associated with a preexisting VPN service, i.e., overloaded (202). If not (NO branch of 202), routing protocol module 36 advertises membership of network device 30 in the community defined by the route target to another BGP speaker of the network.

If, however, the route target is overloaded (YES branch of 202), routing protocol module 36 issues a BGP route refresh message specifying the type of the new VPN service to another BGP speaker of the network (206). In response, routing protocol module 36 receives one or more route advertisements that include matching routes, which routing protocol module resolves and installs to a routing information base. Network device 30 may subsequently forward traffic for the newly-configured VPN service according to the installed routes.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:
1. A method comprising:
  receiving, with a network device, configuration data that defines a first virtual private network (VPN) service and associates the first VPN service with a route target, wherein the route target identifies the network device as a member of a route target extended community;

responsive to receiving the configuration data, sending a request for routes that match a type of the first VPN service from the network device to a routing protocol speaker that stores a first set of routes that match the type of the first VPN service and a second set of routes that match a type of a second VPN service, wherein the request includes first data that identifies the type of the first VPN service;

receiving, with the network device from the routing protocol speaker, the first set of routes that match the type of the first VPN service;

installing routes of the first set of routes that match the type of the first VPN service and are associated with the route target to a routing information base of the network device; and forwarding traffic for the first VPN service with the network device in accordance with the installed routes.

2. The method of claim 1, further comprising:
responsive to receiving the configuration data, determining the route target is associated with the second VPN service previously defined for the network device,
wherein sending the request for routes that match the type of the first VPN service comprises, responsive to determining the route target is associated with the second VPN service, sending a route refresh message to the routing protocol speaker.

3. The method of claim 2, wherein the route refresh message comprises a Border Gateway Protocol message that specifies an Address Family Identifier and a Subsequent Address Family Identifier, wherein a combination of the Address Family Identifier and a Subsequent Address Family Identifier identifies the type of the first VPN service.

4. The method of claim 1,
wherein the routing protocol comprises a Border Gateway Protocol (BGP),
wherein the request for routes that match the type of the first VPN service comprises a BGP message,
wherein the BGP message advertises membership of the network device in a route target extended community corresponding to the route target, and
wherein the BGP message includes a path attribute that identifies the type of the first VPN service.

5. The method of claim 4, wherein the BGP message comprises an MP-REACH-NRLI path attribute that includes a Route Target Membership Network Layer Reachability Information (NLRI) that specifies the route target.

6. The method of claim 4,
wherein the network device stores additional configuration information defining the second VPN service and associating the second VPN service with the route target, and
wherein the path attribute specifies the type of the first VPN service and the type of the second VPN service.

7. The method of claim 4, wherein the path attribute specifies an Address Family Identifier and a Subsequent Address Family Identifier, wherein a combination of the Address Family Identifier and a Subsequent Address Family Identifier identify the type of the first VPN service.

8. The method of claim 1, wherein the type of the first VPN service and the type of the second VPN service are each a different one of a IPv4 layer three VPN (L3VPN), IPv6 L3VPN, IPv4 unicast VPN, IPv6 unicast VPN, IPv4 multicast VPN, IPv6 multicast VPN, Virtual Private LAN Service (VPLS), Virtual Private Multicast Service (VPMS), or Ethernet VPN.

9. A method comprising:
receiving, with a network device that stores a first set of routes that match a type of a first virtual private network (VPN) service and a second set of routes that match a type of a second VPN service, a Border Gateway Protocol (BGP) message from a BGP peer, wherein the BGP message advertises membership of the BGP peer in a route target extended community corresponding to the route target, and wherein the BGP message includes a path attribute that specifies the type of the first VPN service;

identifying, with the network device in response to receiving the BGP message, routes of the first set of routes that match both the type of the first VPN service and the route target; and advertising the identified routes to the BGP peer.

10. The method of claim 9, wherein the path attribute specifies an Address Family Identifier and a Subsequent Address Family Identifier, wherein a combination of the Address Family Identifier and a Subsequent Address Family Identifier identify the type of the first VPN service, the method further comprising:
extracting the Address Family Identifier and the Subsequent Address Family Identifier from the BGP message,
wherein identifying routes stored by the routing information base that match both the type of the first VPN service and the route target comprises matching the Address Family Identifier and the Subsequent Address Family Identifier to one or more of the first set of routes.

11. The method of claim 9, wherein the BGP message comprises an MP-REACH-NRLI path attribute that includes a Route Target Membership Network Layer Reachability Information (NLRI) that specifies the route target.

12. A method comprising:
receiving, with a network device that stores a first set of routes that match a type of a first virtual private network (VPN) service and a second set of routes that match a type of a second VPN service and from a Border Gateway Protocol (BGP) peer that is a member of a route target extended community corresponding to a route target, a request for routes that match the type of the first VPN service, wherein the request includes first data that identifies the type of the first VPN service;

responsive to the request for routes, applying an export policy only to routes of a routing information base of the network device that match both the type of first VPN service and the route target; and sending routes permitted by the export policy to the BGP peer.

13. A network device comprising:
a control unit comprising a processor;
a routing information base;
a management interface executed by the control unit to receive configuration data that defines a first virtual private network (VPN) service and associates the first VPN service with a route target, wherein the route target identifies the network device as a member of a route target extended community; and
a routing protocol module executed by the control unit to, responsive to receiving the configuration data, send a request for routes that match a type of the first VPN service from the network device to a routing protocol speaker that stores a first set of routes that match the type of the first VPN service and a second set of routes that match a type of a second VPN service, wherein the request includes first data that identifies the type of the first VPN service, wherein the routing protocol module receives the first set of routes from the routing protocol speaker that match the type of the first VPN service, wherein the routing protocol module installs the routes of the first set of routes that match the type of the first VPN service and are associated with the route target to the routing information base, and wherein the network device forwards traffic for the first VPN service in accordance with the installed routes.

14. The network device of claim 13, wherein the routing protocol module, responsive to receiving the configuration data, determines the route target is associated with the second VPN service previously defined for the network device, wherein, responsive to determining the route target is associated with the second VPN service, the routing protocol module sends the request for routes that match the type of the first VPN service by sending a route refresh message to the routing protocol speaker.

15. The network device of claim 14, wherein the route refresh message comprises a Border Gateway Protocol message that specifies an Address Family Identifier and a Subsequent Address Family Identifier, wherein a combination of the Address Family Identifier and a Subsequent Address Family Identifier identifies the type of the first VPN service.

16. The network device of claim 13, wherein the routing protocol comprises a Border Gateway Protocol (BGP), wherein the request for routes that match the type of the first VPN service comprises a BGP message, wherein the BGP message advertises membership of the network device in a route target extended community corresponding to the route target, and wherein the BGP message includes a path attribute that identifies the type of the first VPN service.

17. The network device of claim 16, wherein the BGP message comprises an MP-REACH-NRLI path attribute that includes a Route Target Membership Network Layer Reachability Information (NLRI) that specifies the route target.

18. The network device of claim 16, wherein the network device stores additional configuration information defining the second VPN service and associating the second VPN service with the route target, wherein the path attribute specifies the type of the first VPN service and the type of the second VPN service.

19. The network device of claim 16, wherein the type of the first VPN service and the type of the second VPN service are each a different one of a IPv4 layer three VPN (L3VPN), IPv6 L3VPN, IPv4 unicast VPN, IPv6 unicast VPN, IPv4 multicast VPN, IPv6 multicast VPN, Virtual Private LAN Service (VPLS), Virtual Private Multicast Service (VPMS), or Ethernet VPN.

20. The network device of claim 13, wherein the type of the first VPN service and the type of the second VPN service are each a different one of a IPv4 layer three VPN (L3VPN), IPv6 L3VPN, IPv4 unicast VPN, IPv6 unicast VPN, IPv4 multicast VPN, IPv6 multicast VPN, Virtual Private LAN Service (VPLS), Virtual Private Multicast Service (VPMS), or Ethernet VPN.

21. A network device comprising:
a control unit comprising a processor;
one or more routing information bases that store a first set of routes that match a type of a first virtual private network (VPN) service and a second set of routes that match a type of a second VPN service; and
a routing protocol module executed by the control unit to receive a Border Gateway Protocol (BGP) message from a BGP peer, wherein the BGP message advertises membership of the BGP peer in a route target extended community corresponding to the route target, and wherein the BGP message includes a path attribute that specifies a type of the first VPN service, wherein the routing protocol module identifies, in response to receiving the BGP message, routes stored by the one or more routing information bases that match both the type of the first VPN service and the route target, and wherein the routing protocol module advertises the identified routes to the BGP peer.

22. The network device of claim 21, wherein the path attribute specifies an Address Family Identifier and a Subsequent Address Family Identifier, wherein a combination of the Address Family Identifier and a Subsequent Address Family Identifier identify the type of the first VPN service, wherein the routing protocol module extracts the Address Family Identifier and the Subsequent Address Family Identifier from the BGP message, and wherein the routing protocol module identifies routes stored by the routing information base that match both the type of the first VPN service and the route target comprises matching the Address Family Identifier and the Subsequent Address Family Identifier to one or more of the first set of routes.

23. The network device of claim 21, wherein the BGP message comprises an MP-REACH-NRLI path attribute that includes a Route Target Membership Network Layer Reachability Information (NLRI) that specifies the route target.

24. A network device comprising:
a control unit comprising a processor;
one or more routing information bases that store a first set of routes that match a type of a first virtual private network (VPN) service and a second set of routes that match a type of a second VPN service; and
a routing protocol module executed by the control unit to receive, from a Border Gateway Protocol (BGP) peer that is a member of a route target extended community corresponding to a route target, a request for routes that match the type of the first VPN service, wherein the request includes first data that identifies the type of the first VPN service, wherein the routing protocol module, responsive to the request for routes, applies an export policy only to routes of the routing information base that match both the type of first VPN service and the route target, and wherein the routing protocol module sends routes permitted by the export policy to the BGP peer.

* * * * *